(12) United States Patent
Blackshire et al.

(10) Patent No.: US 10,794,871 B1
(45) Date of Patent: Oct. 6, 2020

(54) ELASTOMER ULTRASONIC COUPLING ADAPTOR FOR FOCUSED TRANSDUCERS

(71) Applicant: Government of the United States, as represented by the Secretary of the Air Force, Wright-Patterson AFB, OH (US)

(72) Inventors: James L. Blackshire, Bellbrook, OH (US); Jeong K. Na, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 261 days.

(21) Appl. No.: 15/987,168

(22) Filed: May 23, 2018

(51) Int. Cl.
| | |
|---|---|
| *G01N 29/265* | (2006.01) |
| *G01N 29/28* | (2006.01) |
| *G01N 29/24* | (2006.01) |
| *G01N 29/11* | (2006.01) |
| *G01N 29/07* | (2006.01) |
| *G01N 29/26* | (2006.01) |

(52) U.S. Cl.
CPC .......... *G01N 29/265* (2013.01); *G01N 29/07* (2013.01); *G01N 29/11* (2013.01); *G01N 29/24* (2013.01); *G01N 29/262* (2013.01); *G01N 29/28* (2013.01)

(58) Field of Classification Search
CPC ........ G01N 29/07; G01N 29/11; G01N 29/24; G01N 29/28; G01N 29/262; G01N 29/265
See application file for complete search history.

(56) References Cited

U.S. PATENT DOCUMENTS

| | | | |
|---|---|---|---|
| 3,777,552 A | * | 12/1973 | Fletcher ................. G01N 29/26 73/622 |
| 4,143,553 A | | 3/1979 | Martens et al. |
| 4,468,966 A | | 9/1984 | Bradshaw |

(Continued)

FOREIGN PATENT DOCUMENTS

| | | |
|---|---|---|
| WO | WO8203920 | 11/1982 |
| WO | WO2008071272 | 6/2008 |

OTHER PUBLICATIONS

NDT Supply, TOFD Transducers and Wedges, http://ndtsupply.com/keiyu-ndt-tofd-transducers-and-wedges.html, downloaded from the internet on Feb. 15, 2018.

(Continued)

*Primary Examiner* — Natalie Huls
(74) *Attorney, Agent, or Firm* — AFMCLO/JAZ; Timothy M. Barlow

(57) ABSTRACT

An apparatus for non-destructive ultrasonic testing is disclosed that permits focused immersion measurements to be accomplished in a non-immersion, contact mode. The apparatus includes an adaptor for acoustically coupling an elastomeric body to a focused ultrasonic transducer via an acoustic couplant. The adaptor includes a housing for receiving the elastomeric body on one end, and the ultrasonic transducer on another end. A cavity is defined within the housing for receiving a liquid medium that acoustically couples the ultrasonic transducer to the elastomeric body. The elastomeric body has a frontal surface disposed at a face slant angle relative to a longitudinal axis, where the face slant angle can be optimized for the test material. The volume of the housing cavity may be adjusted so as to vary the focal length of the ultrasonic transducer.

18 Claims, 4 Drawing Sheets

(56) References Cited

U.S. PATENT DOCUMENTS

| | | | |
|---|---|---|---|
| 4,977,780 A * | 12/1990 | Machida | A61B 8/4281 600/459 |
| 5,426,980 A | 6/1995 | Smith | |
| 5,585,565 A | 12/1996 | Glascock et al. | |
| 6,276,212 B1 * | 8/2001 | Cooper | G10K 9/122 310/324 |
| 6,578,424 B1 | 6/2003 | Ziola et al. | |
| 6,782,751 B2 | 8/2004 | Linares et al. | |
| 6,938,488 B2 | 9/2005 | Diaz et al. | |
| 6,951,134 B1 | 10/2005 | Mueller | |
| 7,234,353 B2 | 6/2007 | Mueller et al. | |
| 7,496,456 B2 | 2/2009 | Hiyama et al. | |
| 7,694,569 B2 * | 4/2010 | McGrath | G01N 29/225 73/641 |
| 7,954,387 B1 * | 6/2011 | Furlong | G01F 1/74 73/861.28 |
| 8,047,081 B2 * | 11/2011 | Berberig | G01F 1/662 73/644 |
| 8,082,793 B2 | 12/2011 | Sarr et al. | |
| 8,087,298 B1 | 1/2012 | Dimambro et al. | |
| 8,100,015 B2 * | 1/2012 | Karasawa | G01N 29/226 73/602 |
| 8,166,823 B2 | 5/2012 | Lam et al. | |
| 8,413,515 B2 * | 4/2013 | Isobe | G01N 29/221 73/602 |
| 8,907,544 B2 | 12/2014 | Naka | |
| 9,360,461 B2 | 6/2016 | Na et al. | |
| 9,366,655 B2 | 6/2016 | Hutchinson et al. | |
| 9,632,063 B2 | 4/2017 | Metayer et al. | |
| 9,766,212 B2 | 9/2017 | Simonet et al. | |
| 9,778,231 B2 | 10/2017 | Koerner et al. | |
| 2005/0139013 A1 * | 6/2005 | Hashimoto | G01F 1/662 73/861.27 |
| 2017/0074831 A1 | 3/2017 | Zhang et al. | |

OTHER PUBLICATIONS

Ginzel et al., Ultrasonic Properties of a New Low Atttenuation Dry Couplant Elastomer, http://www.ndt.net/article/ginzel/ginzel.htm, Apr. 1994.

* cited by examiner

ELASTOMER ULTRASONIC COUPLING ADAPTOR FOR FOCUSED TRANSDUCERS

STATEMENT OF GOVERNMENT INTEREST

The disclosure described herein may be manufactured, used, and licensed by or for the Government of the United States for all governmental purposes without the payment of any royalty.

BACKGROUND

Focused ultrasonic transducers are used to perform immersion nondestructive inspections of various components, such as, for example, aircraft parts. In typical applications of this type, the test specimen is fully immersed in a liquid medium. The transducer generates a localized, millimeter-diameter ultrasonic beam having a small focal size, i.e., several millimeters, and directs beam over a short distance against the part being inspected. Voids and/or defects in the test specimen may be detected by examining the returned ultrasound waveform in response to the application of ultrasonic energy from the transducer. The received ultrasonic waveform is either reflected or attenuated by the test specimen. In reflection mode, the transducer performs both the sending and the receiving of the pulsed waves as the "sound" is reflected back to the device. Reflected ultrasound comes from an interface, such as the back wall of the object or from an imperfection within the object. A diagnostic machine displays these results in the form of a signal with an amplitude representing the intensity of the reflection, and the arrival time representing the standoff distance of the reflection. In attenuation mode, a transmitter sends ultrasound through one surface, and a separate receiver detects the amount that has reached it on another surface after traveling through the medium. The presence of imperfections or other conditions in the space between the transmitter and receiver are indicated by the reduced amount of sound transmitted through the test specimen.

An alternative contact inspection expedient utilizes application of a thin acoustic coupling layer such as water, gel, or oil, between the front surface of the transducer and the surface of the part being inspected. However, the concave-shaped front surface of these transducers renders them unsuitable for contact inspections due to part shapes that make it difficult to couple and focus the ultrasonic waves.

Thus, it would be advantageous to provide a novel acoustic coupling adapter for a focused transducer that enables the focused transducer to mimic immersion nondestructive inspections in a contact inspection.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1A:
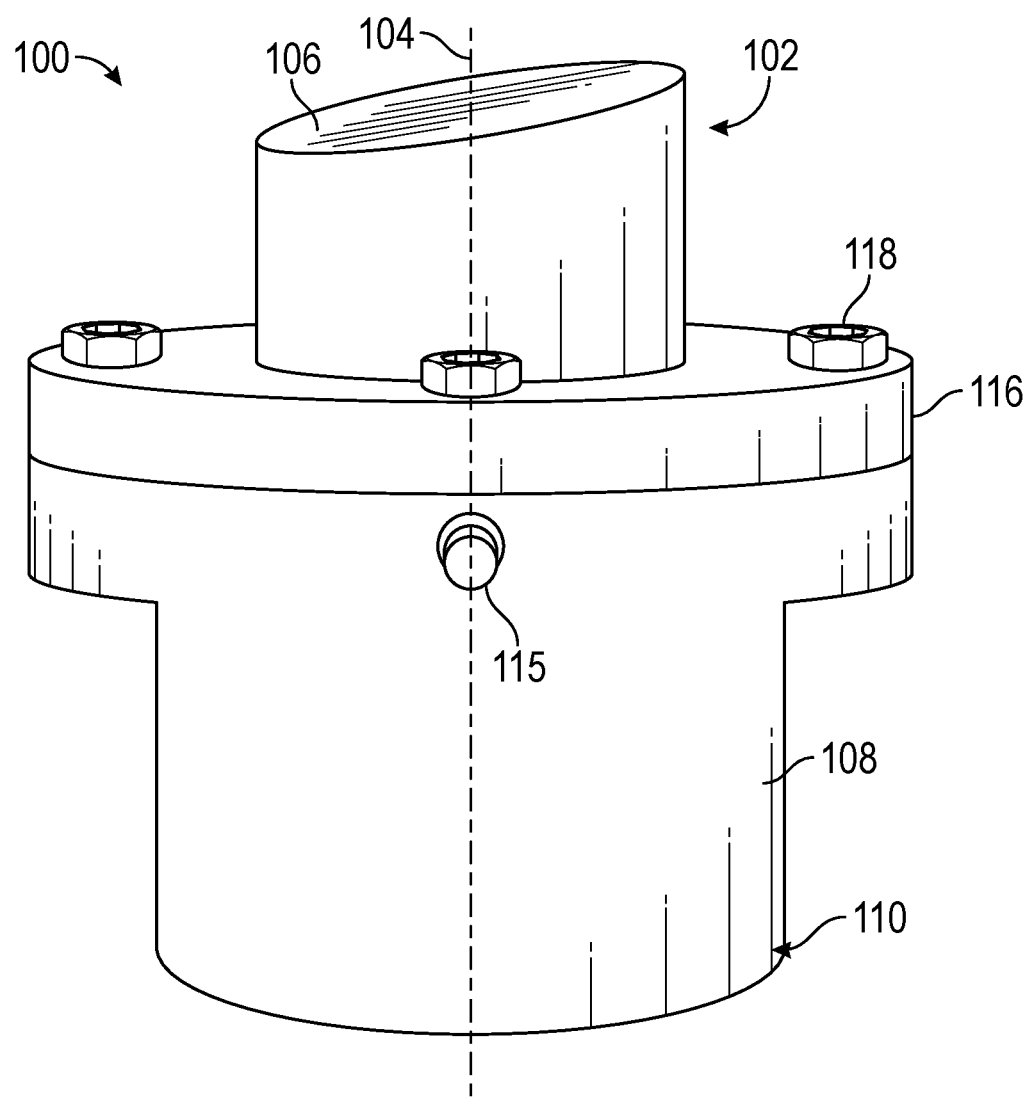
FIG. 1A is an elevational and inverted view of an apparatus for facilitating non-destructive testing of a test specimen in accordance with an embodiment of the present disclosure.
Figure 1B:
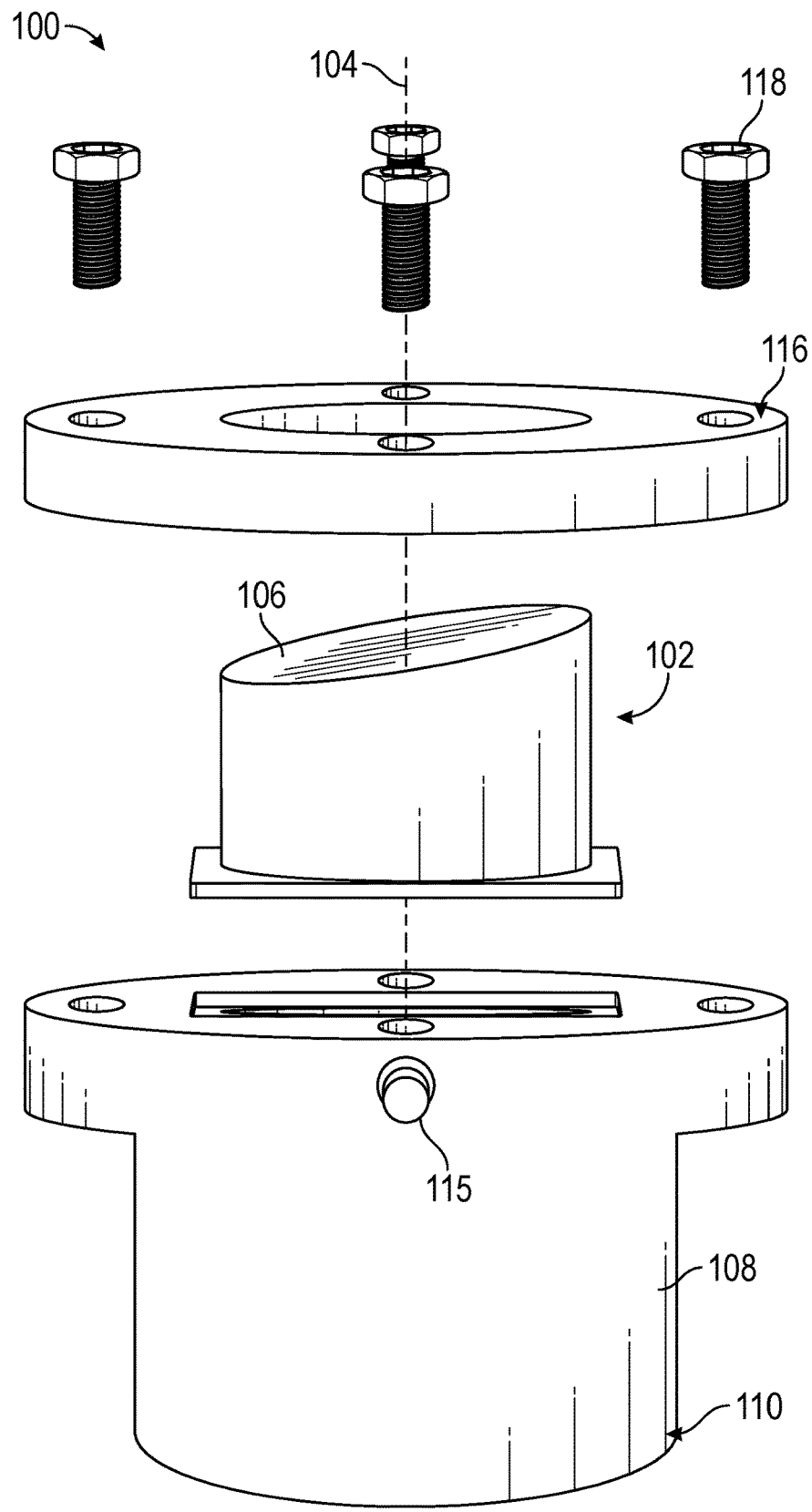
FIG. 1B is an exploded view thereof.
Figure 2:
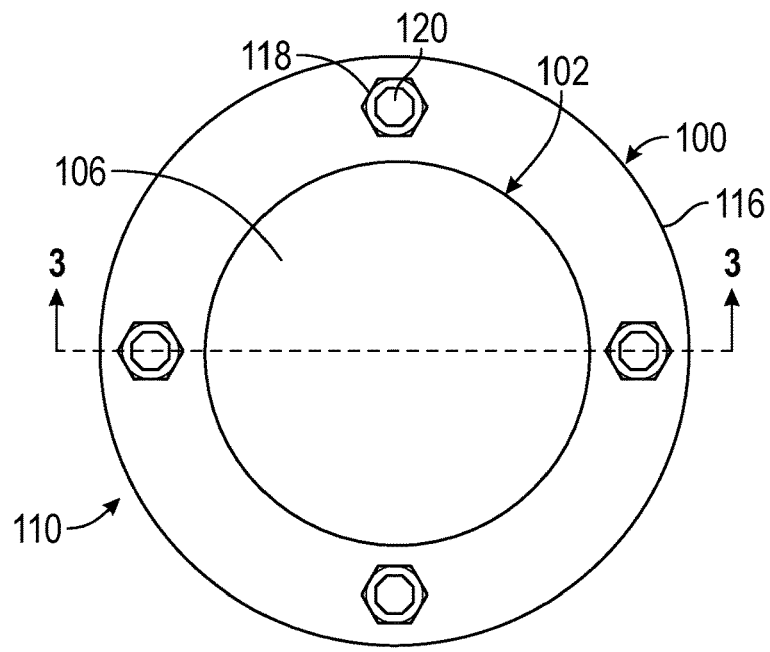
FIG. 2 is a top plan view thereof.

Specific embodiments of the disclosure will now be described in detail with reference to the accompanying figures. For simplicity and clarity of illustration, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described. Also, the description is not to be considered as limiting the scope of the examples disclosed herein.

It will further be appreciated that the examples and corresponding diagrams as described are for illustrative purposes only. Different configurations and terminology may be used without departing from the principles expressed herein. For instance, components and modules can be added, deleted, modified, or arranged with differing connections without departing from these principles.

Recitation of ranges of values herein are not intended to be limiting, referring instead individually to all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

An apparatus for non-destructive ultrasonic testing is disclosed that permits focused immersion measurements to be accomplished in a non-immersion, contact mode. The apparatus includes an adaptor for acoustically coupling an elastomeric body to a focused ultrasonic transducer via an acoustic couplant. The adaptor includes a housing for receiving the elastomeric body on one end, and the ultrasonic transducer on another end. A cavity is defined within the housing for receiving a liquid medium that acoustically couples the ultrasonic transducer to the elastomeric body.

The elastomeric body has a frontal surface disposed at a face slant angle relative to a longitudinal axis, where the face slant angle can be optimized for the test material. The volume of the housing cavity may be adjusted so as to vary the focal length of the ultrasonic transducer.

In accordance with an embodiment of the present disclosure, there is provided an apparatus for focused immersion non-destructive ultrasonic testing. The apparatus includes an elastomeric body defining a longitudinal axis and a frontal surface disposed at a face slant angle relative to the longitudinal axis. An adapter having a housing defining a cavity therein for receiving an acoustic couplant is acoustically coupled to a portion of the elastomeric body and a focused ultrasonic transducer, such that the acoustic couplant transmits focusing ultrasonic waves between the ultrasonic transducer and an object undergoing non-destructive ultrasonic inspection.

In accordance with a further embodiment of the present disclosure, the elastomeric body has an acoustic impedance of in the range of 1.45 MRayls to 1.48 MRayls.

In accordance with yet another embodiment of the present disclosure, the cavity defined in the adapter housing is bounded by a curved face of the focused ultrasonic transducer and a flat top surface of the elastomeric body.

In accordance with another embodiment of the present disclosure, a volume of the cavity is adjustable.

In accordance with another embodiment of the present disclosure, the adapter is configured to receive at least one O-ring for varying the volume of the cavity, transducer height, and ultrasonic focal length.

In accordance with still another embodiment of the present disclosure, the adapter further includes a housing cap removably coupled to the adapter housing for selectively adding or removing O-rings.

In accordance with another embodiment of the present disclosure, the adapter housing defines a bore therein configured to receive a portion of the elastomeric body.

In accordance with still another embodiment of the present disclosure, the elastomeric face slant angle defines a beam incident angle $\theta$, and a corresponding refraction angle for a mode-converted shear wave $\phi$ in the object described by $V_1 \cdot \sin \phi = V_2 \cdot \sin \theta$, where $(V_1)$ and $(V_2)$ represent respective sound propagation velocities through the elastomeric body and the object.

In accordance with still another embodiment of the present disclosure, the apparatus further includes a probe holding fixture.

In accordance with yet another embodiment of the present disclosure, the apparatus further includes an auto-adjustable scanning arm.

In accordance with another embodiment of the present disclosure, the transducer includes a phased-array probe.

Referring now to FIGS. 1A, 1B, 2, and 3, there is depicted an apparatus 100 for enabling non-destructive ultrasonic testing of a test specimen 101 in accordance with an embodiment of the present disclosure. The apparatus 100 includes an elastomeric body 102 defining a longitudinal axis 104 and having a frontal surface 106 disposed at a face slant angle $\theta$ (see FIG. 3) relative to the longitudinal axis 104. The elastomeric body 102 may be constructed from an elastomer such as Aqualene™, which provides a preferred acoustic impedance in the range of 1.45 MRayls to 1.48 MRayls. Thus, the elastomeric body 102 has an acoustic impedance substantially identical to water.

The apparatus 100 further includes an adapter assembly 108 having a housing 110 that defines a bore (cavity) 112 therein for receiving an acoustic couplant 114 such as water. The acoustic couplant can be added via a side port 115 in the housing 110. The side port 115 is sealable and fluidly communicates with the cavity 112. The adaptor assembly 108 further includes a cap 116 that is removably attached to the housing 110 with a plurality of fasteners 118. The cap 116 is provided with a plurality of circumferentially spaced openings 120 for receiving the fasteners 118. The fasteners 118 may be threaded into the housing, or secured with washers in a conventional manner. The housing further includes a flange portion 122 on one end, which has a plurality of circumferentially spaced openings 124. The fasteners 118 extend through the cap 116 to enable the cap 116 to be removably secured to the housing 110. A seal or gasket 126 is disposed between a top surface of the flange portion 122 and the cap 116.

Figure 3:
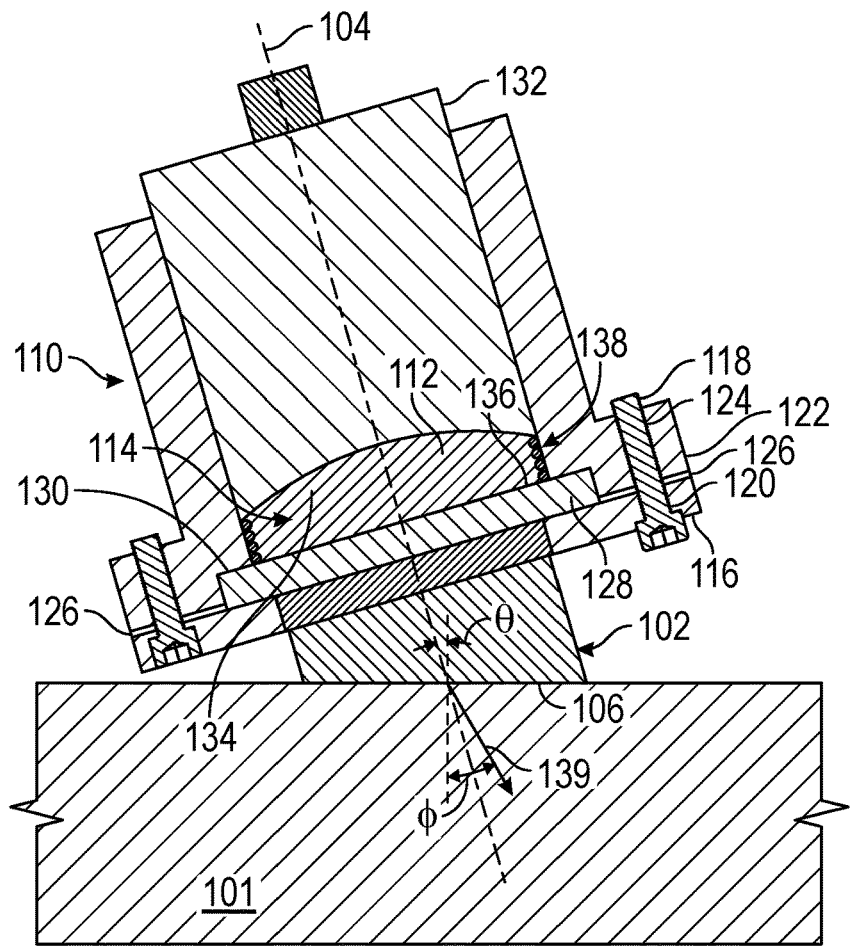
FIG. 3 is a partial sectional view thereof along lines 3-3 in FIG. 2, showing the apparatus positioned relative to a test specimen.

The elastomeric body 102 includes a flange 128 that sits against a shoulder 130 defined in the housing 110. The flange 128 is placed against the shoulder 130, and the cap 116 is placed over the flange 128 to secure and retain the elastomeric body 102 within the housing 110. A focused ultrasonic transducer 132 is inserted into the housing 110 from the other end as best seen in FIG. 3. The ultrasonic transducer 132 is a transducer, such as a longitudinal-mode focused transducer, and includes a concave-shaped front surface 134 from which ultrasonic waves are transmitted. In one embodiment, the ultrasonic transducer 132 may embody a phase-array probe. The cavity 112 containing the acoustic couplant 114 is defined by the concave-shaped front surface 134 of the ultrasonic transducer 132, an interior bore of the housing 110 and a rear surface 136 of the elastomeric body 102. This couplant 114 enables a portion 128 of the elastomeric body 102 (rear surface 136) to acoustically couple to the ultrasonic transducer 132. In this manner, the acoustic couplant 114 transmits ultrasonic waves between the ultrasonic transducer 132 and a test specimen 101 undergoing non-destructive ultrasonic inspection. An example ultrasonic transducer 132 usable for this purpose is available for purchase on the market under the product name: Focused Ultrasonic Immersion Probes, by KBRWyle, which can be obtained from Advanced NDI in Dayton Ohio. In accordance with an embodiment of the present disclosure, the volume of the cavity 112 can be made adjustable. By way of example, one or more removable O-rings or spacers 138 may be placed within the cavity 112 and disposed between the edge of the concave-shaped front surface 134 of the ultrasonic transducer 132 and the rear surface 136 of the elastomeric body 102. The O-rings or spacers may be selectively added and removed by simply removing the cap 116 from the flange portion 122 of the housing 110, and the elastomeric body 102 from within the housing 110. After changing the number of O-rings 138, the elastomeric body 102 is reinserted into the housing 110, and the cap is secured to the flange portion 122 with the fasters 118 as described above. Alternatively, the ultrasonic transducer 132 may be externally locked in place at various axial locations relative to the housing 110 (not shown) such that the concave-shaped front surface is disposed at varying distances from the rear surface 136 of the elastomeric body. It will be appreciated by those skilled in the art that the thickness and diameter of the elastomeric body can be customized depending on the focal length and diameter of the ultrasonic transducer 132. The focal length can be adjusted by adding or the removing O-rings 138 to vary the volume of the cavity 112 between the ultrasonic transducer 132 and the elastomeric body 102.

Referring again to FIG. 3, in accordance with the present disclosure the face slant angle of the elastomeric body 102 equals a beam incident angle $\theta$, and a refraction angle $\phi$ for a mode-converted shear wave 139 that propagates through the test specimen 101 are represented by $V_1 \cdot \sin \phi = V_2 \cdot \sin \theta$, where ($V_1$) and ($V_2$) represent respective sound propagation velocities through the elastomeric body 102 and the test specimen 101. When a mode-converted shear wave inspection is required in an immersion set up, the launch angle of the incident beam against the surface of test specimen 101 needs to be adjusted between 13 and 28 degrees, i.e., for aluminum, to induce pure shear mode signals. However, when a contact inspection is performed with a typical angle block made of Lucite or a similar type of plastic material, the incident angle should be steeper, for example, between approximately 26 and 58 degrees. In accordance with embodiments of the present disclosure, the front surface 106 of the elastomeric body 102 can be configured with a particular slant angle to optimally satisfy the mode conversion condition for the test specimen material. In this manner, embodiments of the present disclosure advantageously make it possible to inspect the part with a focused beam in a contact set up at a shallower beam incident beam angle than implemented in an immersion-type inspection.

Figure 4:
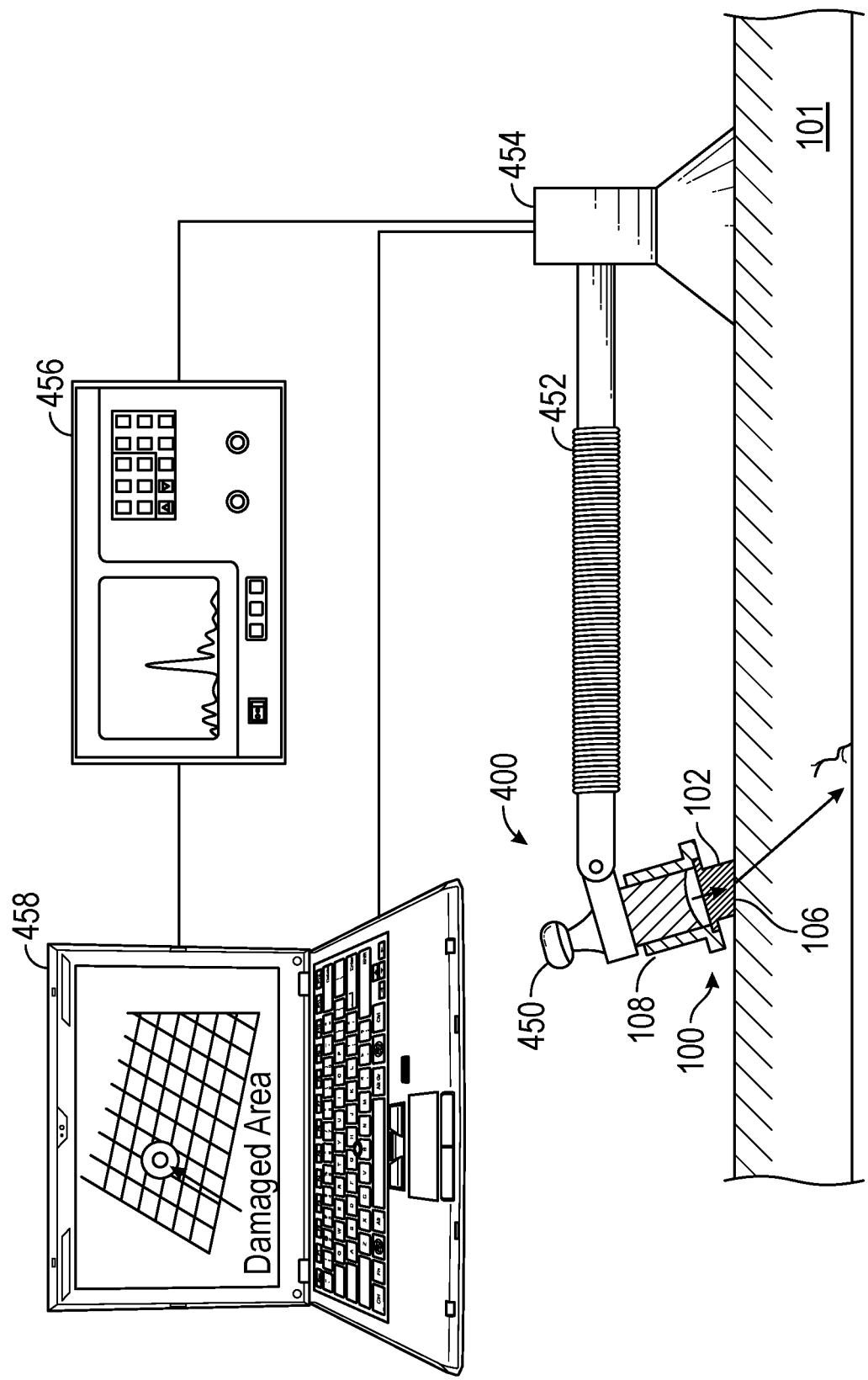
FIG. 4 is a high-level pictorial representation of the apparatus in combination with an auto-adjustable scanning arm and general hardware for implementing non-destructive testing in accordance with an embodiment of the present disclosure.

Referring now to FIG. 4, there is depicted another embodiment of the present disclosure 400 that includes a probe holding fixture 450 coupled to an auto-adjustable scanning arm 452. The probe holding fixture 450 is connected to an adaptor 108 (FIG. 1), which includes a housing 110, ultrasonic transducer 132 and elastomeric body 102 as described above. The probe holding fixture 450 and auto-adjustable scanning arm 452 enable the ultrasonic transducer 132 and elastomeric body 102 to be positioned relative to test specimen 101 for performing non-destructive ultrasonic testing. As described above, the front face 106 of the elastomeric body 102 is slanted at the optimal angle for the material undergoing the test. The auto-adjustable scanning arm 452 may be translated relative to the surface of the material to test for the presence of voids, cracks and the like throughout the material. The auto-adjustable scanning arm is operably connected to position encoders 454 that direct the probe relative to the test specimen. The position encoders 454 are coupled to an ultrasonic pulse generator/receiver 456 of the type known in the art for generating ultrasonic pulses and receiving reflected or attenuated waves from the test medium. This data may be processed using known techniques for displaying an area of damage in the test specimen on the display of an electronic device generally shown at 458.

The above systems, devices, methods, processes, and the like may be realized in hardware, software, or any combination of these suitable for an application. The hardware may include unique digital processing, a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in several ways. At the same time, processing may be distributed across devices such as the various systems described above, or all the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. An apparatus for focused immersion non-destructive ultrasonic testing, comprising:
   an elastomeric body defining a longitudinal axis and a frontal surface disposed at a face slant angle relative to the longitudinal axis;
   an adapter having a housing defining a cavity therein for receiving an acoustic couplant, where the cavity defined in the adapter housing is bounded by a curved face of the focused ultrasonic transducer and a flat top surface of the elastomeric body, the adapter acoustically coupled to a portion of the elastomeric body and an ultrasonic transducer such that the acoustic couplant transmits ultrasonic waves between the ultrasonic transducer and an object undergoing non-destructive ultrasonic inspection.

2. The apparatus according to claim 1, where the elastomeric body has an acoustic impedance of in the range of 1.45 MRayls to 1.48 MRayls.

3. The apparatus according to claim 1, where a volume of the cavity is adjustable.

4. The apparatus according to claim 3, where the adapter is configured to receive at least one O-ring operable to vary the volume of the cavity and ultrasonic focal length.

5. The apparatus according to claim 4, where the adapter further comprises a housing cap removably coupled to the adapter housing.

6. The apparatus according to claim 1, where the adapter housing defines a bore therein configured to receive a portion of the elastomeric body.

7. The apparatus according to claim 1, where the face slant angle equals a beam incident angle $\theta$, and a refraction angle for a mode-converted shear wave $\phi$ are represented by $V_1 \sin \phi = V_2 \cdot \sin \theta$, where ($V_1$) and ($V_2$) represent respective sound propagation velocities through the elastomeric body and the object.

8. The apparatus according to claim 1, further comprising a probe holding fixture.

9. The apparatus according to claim 1, further comprising an auto-adjustable scanning arm.

10. The apparatus according to claim 1, where the transducer comprises a phased-array probe.

11. An apparatus for non-destructive ultrasonic testing, comprising:

an elastomeric body defining a longitudinal axis and a frontal surface disposed at a face slant angle relative to the longitudinal axis;

an adapter having a housing defining a bore for receiving a portion of the elastomeric body and an ultrasonic transducer, the housing further defining a cavity therein of adjustable volume for receiving an acoustic couplant between a face of the elastomeric body and the ultrasonic transducer, where the cavity defined in the adapter housing is bounded by a curved face of the focused ultrasonic transducer and a flat top surface of the elastomeric body, the adapter acoustically coupled to a portion of the elastomeric body and the ultrasonic transducer such that the acoustic couplant transmits ultrasonic waves between the ultrasonic transducer and an object undergoing non-destructive ultrasonic inspection.

12. The apparatus according to claim 11, where the elastomeric body has an acoustic impedance of in the range of 1.45 MRayls to 1.48 MRayls.

13. The apparatus according to claim 11, where the adapter is configured to receive at least one O-ring operable to vary the volume of the cavity and ultrasonic focal length.

14. The apparatus according to claim 13, where the adapter further comprises a housing cap removably coupled to the adapter housing.

15. The apparatus according to claim 11, where the face slant angle equals a beam incident angle $\theta$, and a refraction angle for a mode-converted shear wave $\phi$ are represented by $V_1 \cdot \sin \phi = V_2 \cdot \sin \theta$, where $(V_1)$ and $(V_2)$ represent respective sound propagation velocities through the elastomeric body and the object.

16. An apparatus for non-destructive ultrasonic testing, comprising:

an elastomeric body defining a longitudinal axis and a frontal surface disposed at a face slant angle relative to the longitudinal axis; and an adapter having a housing defining a bore for receiving a portion of the elastomeric body and an ultrasonic transducer having a curved face on one side thereof, the housing further defining a cavity of adjustable volume for receiving an acoustic couplant between a face of the elastomeric body and the ultrasonic transducer, where the cavity defined in the adapter housing is bounded by a curved face of the focused ultrasonic transducer and a flat top surface of the elastomeric body, the adapter having a removable cap and at least one O-ring operable to vary the volume of the cavity, the adapter acoustically coupled to a portion of the elastomeric body and the ultrasonic transducer such that the acoustic couplant transmits ultrasonic waves between the ultrasonic transducer and an object undergoing non-destructive ultrasonic inspection.

17. The apparatus according to claim 16, where the elastomeric body has an acoustic impedance of in the range of 1.45 MRayls to 1.48 MRayls.

18. The apparatus according to claim 16, where the face slant angle equals a beam incident angle $\theta$, and a refraction angle for a mode-converted shear wave $\phi$ are represented by $V_1 \cdot \sin \phi = V_2 \cdot \sin \theta$, where $(V_1)$ and $(V_2)$ represent respective sound propagation velocities through the elastomeric body and the object.

* * * * *